US010013829B2

(12) United States Patent
Taylor et al.

(10) Patent No.: US 10,013,829 B2
(45) Date of Patent: Jul. 3, 2018

(54) APPARATUS AND METHOD FOR SECURING MERCHANDISE WITH OPTICAL LOCK AND KEY

(71) Applicant: Wal-Mart Stores, Inc., Bentonville, AR (US)

(72) Inventors: Robert J. Taylor, Rogers, AR (US); Nicholaus A. Jones, Fayetteville, AR (US); Aaron J. Vasgaard, Rogers, AR (US); Jeffrey S. Cruz, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/287,548

(22) Filed: Oct. 6, 2016

(65) Prior Publication Data

US 2017/0103595 A1 Apr. 13, 2017

Related U.S. Application Data

(60) Provisional application No. 62/239,511, filed on Oct. 9, 2015.

(51) Int. Cl.
*G06K 7/14* (2006.01)
*G07C 9/00* (2006.01)
(Continued)

(52) U.S. Cl.
CPC .......... *G07C 9/00182* (2013.01); *E05B 35/00* (2013.01); *E05B 49/00* (2013.01);
(Continued)

(58) Field of Classification Search
CPC .......................... G07C 9/00309; G07F 7/1025
(Continued)

(56) References Cited

U.S. PATENT DOCUMENTS 5,337,043 A 8/1994 Gokcebay
6,055,079 A 4/2000 Hagans
(Continued)

FOREIGN PATENT DOCUMENTS

CN 202012242 U 10/2011
CN 103093530 A 5/2013
(Continued)

OTHER PUBLICATIONS

PCT; App. No. PCT/US2016/056001; International Search Report and Written Opinion dated Dec. 15, 2016.

*Primary Examiner* — Jamara Franklin
(74) *Attorney, Agent, or Firm* — Fitch, Even, Tabin & Flannery LLP

(57) ABSTRACT

Systems, apparatuses, and methods are provided herein for securing merchandise. In one embodiment an apparatus for securing merchandise comprises a locking mechanism limiting access to one or more items, one or more optical sensors configured to detect a plurality of wavelengths and an intensity associated with each wavelength from at least one light beam emitted by an optical key, and a control device comprising a control circuit and a memory device. The control device being configured to store a lock code comprising a plurality of wavelength values and a plurality of intensity values each associated with a wavelength value on the memory device and determine whether to release the locking mechanism based on whether intensities of each of the plurality of wavelengths detected by the one or more optical sensors match the lock code.

23 Claims, 4 Drawing Sheets

(51) Int. Cl.
    *E05B 35/00*     (2006.01)
    *E05B 49/00*     (2006.01)
    *E05B 73/00*     (2006.01)
    *G06K 7/10*     (2006.01)
    *G06K 19/06*     (2006.01)

(52) U.S. Cl.
    CPC .......... *E05B 73/00* (2013.01); *G06K 7/10881* (2013.01); *G06K 19/06028* (2013.01)

(58) Field of Classification Search
    USPC ........................................ 235/380, 382, 454
    See application file for complete search history.

(56) References Cited

U.S. PATENT DOCUMENTS

| | | |
|---|---|---|
| 8,462,322 B2 | 6/2013 | Duffy |
| 2005/0200454 A1* | 9/2005 | Martinez ............ E05B 47/0611 340/5.65 |
| 2006/0224901 A1 | 10/2006 | Lowe |
| 2007/0080806 A1 | 4/2007 | Lax |
| 2010/0172135 A1 | 7/2010 | Holder |

FOREIGN PATENT DOCUMENTS

| | | |
|---|---|---|
| CN | 202976282 U | 6/2013 |
| CN | 202976293 U | 6/2013 |
| CN | 203097489 U | 7/2013 |
| CN | 103295285 A | 9/2013 |

\* cited by examiner

APPARATUS AND METHOD FOR SECURING MERCHANDISE WITH OPTICAL LOCK AND KEY

CROSS-REFERENCE TO RELATED APPLICATION

This application claims the benefit of U.S. Provisional Application No. 62/239,511, filed Oct. 9, 2015, which is incorporated herein by reference in its entirety.

TECHNICAL FIELD

This invention relates generally to merchandise protection.

BACKGROUND

In a shopping space, items with high risk of theft are sometimes locked within a display shelf or a locked case. Traditionally, these items are locked with conventional metal lock and key. When a customer requests access to an item, a store clerk would locate and retrieve the key to open the case. When a key is lost, the lock often needs to be replaced and/or reconfigured to prevent unauthorized access.

BRIEF DESCRIPTION OF THE DRAWINGS

Disclosed herein are embodiments of apparatuses and methods for securing merchandise with optical lock and key. This description includes drawings, wherein.

Figure 1:
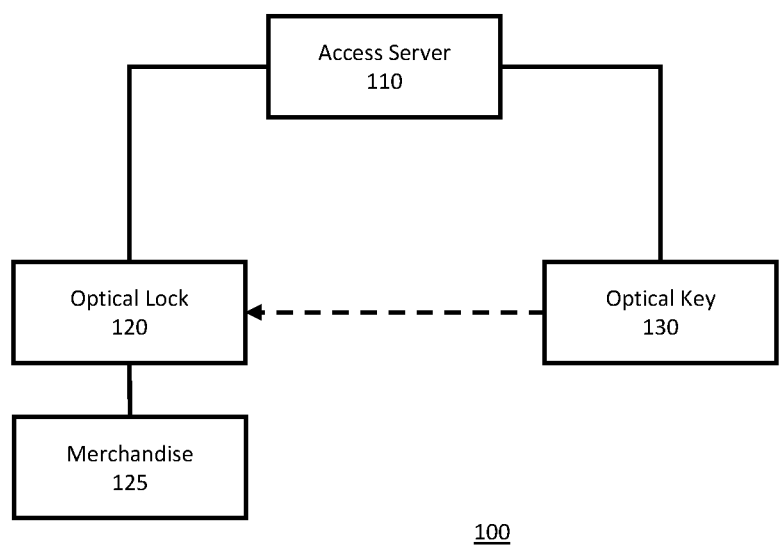
FIG. 1 is a block diagram of a system in accordance with several embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for securing merchandise. An apparatus for securing merchandise comprises a locking mechanism limiting access to one or more items, one or more optical sensors configured to detect a plurality of wavelengths and an intensity associated with each wavelength from at least one light beam emitted by an optical key, and a control device comprising a control circuit and a memory device. The control device being configured to store a lock code comprising a plurality of wavelength values and a plurality of intensity values each associated with a wavelength value on the memory device and determine whether to release the locking mechanism based on whether intensities of each of the plurality of wavelengths detected by the one or more optical sensors match the lock code.

Conventional locked cases in retail stores (sales floor and backroom) as well as in distribution centers suffer from several problems including 1) loss or misplacement of the physical keys that unlock the case, 2) time required to locate the physical key to unlock the case, and 3) lack of knowledge of who is accessing the locked case and/or the key(s). A lock that is activated (locked or unlocked) using a light detector/spectrometer can identify specific wavelengths of visible or non-visible light and/or combinations and ratios of specific wavelengths of visible or non-visible light and/or amount of time a specific wavelength(s) is/are detected to secure merchandise.

In some embodiments, the laser(s) used in current store handheld scanners may be used to activate a lock with an optical lock tuned to detect that wavelength of the laser (e.g. 650 nanometers, Red). This laser is emitted when a typical barcode scanning action is taken which may be accessed through any screen on the store point of sales system, may be part of a handheld scanner, part of the stores' user interface system, etc. This embodiment would enable any associate to unlock the case much faster with roughly the same security as a physical key.

In some embodiments, additional specific wavelength laser(s) could be included in the scanner and the optical lock tuned to recognize and be activated upon detecting the two or more wavelengths and/or relative intensities of each wavelength and/or length of time each wavelength is detected. The laser output may be activated using a specific tool on a store-owned handheld scanner with associated access permission. A database may track which associate accessed the "Lock/Unlock" tool and when a tool is used to lock/unlock. The device may further be used to scan items in and out of a locked space.

In some embodiments, optical locks may communicate with a central server via a wired and/or wireless network. Security measures may be instituted (similar to an alphanumeric passcode that changes over time that is tied to the user) where a specific user would activate the lock via a specific combination of intensity and/or time that each laser is emitted from the scanner and detected by the lock. A server may log which user accessed which lock and at what time and prevent discrepancies when multiple locks were accessed at the same time.

The disclosed system enables better customer service for items in locked case locations by enabling more associates access via a digital tool and still offers loss prevention benefits of locked cases. Once in production, the cost of maintenance of lock/key combinations may be greatly reduced, enabled by the light detection as well as the digital and networked nature of the locks. The system described herein may use combinations of visible or non-visible light to activate locks, which cannot be easily duplicated (as compared to physical key/lock combination) and is not vulnerable to standard password-based technology (which can be guessed, shared, or stolen).

Referring now to FIG. 1, a system for controlling access to merchandise is shown. The system 100 includes an access server 110, an optical key 130, and an optical lock 120 restricting access to merchandise 125. The optical key 130 includes one or more light sources configured to emit light in a plurality of wavelength ranges, each at a specified intensity. In some embodiments, optical key 130 may emit a single light beam with multiple wavelength peaks. In some embodiments, the optical key 130 may emit a plurality of light beams each with a narrow wavelength band from multiple physical light emitting devices such as laser and light emitting diode (LED). In some embodiments, the light sources may emit light inside and outside of the visible spectrum. In some embodiments, the optical key 130 may be implemented with one or more of a portable device (e.g. portable scanner, reader, etc.) used by store or transportation associates, as an attachment to a portable device, as part of a point of sales system (e.g. checkout counter, handheld or flatbed barcode scanner, etc.), and/or as part of a shipping and receiving system (delivery truck, warehouse storage container, etc.). In some embodiments, the light source of the optical key 130 may be configured to adjust one or more of the frequency and the intensity of the emitted light. In some embodiments, the optical key 130 further includes a user interface for user authentication. For example, the optical key 130 may require that a user login to the device and/or the system 100 prior to activating the light sources of the optical key 130 to unlock an optical lock 120. Further details of some embodiments of the optical key are described with reference to FIG. 2 below.

The optical lock 120 includes one or more optical sensors configured to detect a plurality of wavelengths and an intensity associated with each wavelength from at least one light beam emitted by the optical key. The optical sensor(s) may be configured to detect light from a light source at a short distance (e.g. several feet) or in close proximity (e.g. several centimeters or less) of the sensor. In some embodiments, the optical lock 120 may include one or more of a light sensor, a photon sensor, and a spectrometer. The optical lock 120 may be configured to compare the emitted light beam(s) from the optical key with a lock code that specifies multiple of wavelength and intensity combinations to determine whether to release a locking mechanism and provide access to merchandise 125. In some embodiments, the lock code may be updated remotely and/or locally to rekey the optical lock 120. For example, the optical lock 120 may comprise a reset button which, when pressed, stores the detected wavelengths and frequencies combination as a new lock code. The optical lock 120 may be integrated with and/or attached to one or more of a display shelf, a portable casing, a storage container, a transportation container, a secured shopping space, and a secured storage space. Further details of some embodiments of the optical key is described with reference to FIG. 2 below.

The merchandise 125 may be items in the shopping space and/or distribution chain. In some embodiments, the merchandise 125 may be enclosed in a portable casing that may be removed by releasing the locking mechanism of the optical lock 120. In some embodiments, the merchandise 125 may be a group of items locked in a secured area in a shopping space. In some embodiments, the merchandise 125 may be secured within a transportation and/or storage container such as a crate, a cage, etc.

In some embodiments, the system includes an access server 110 that communicates with the optical lock and/or the optical key 130 to provide lock codes for accessing merchandise. The communication between the access server 110 and the optical lock 120 and/or the optical key 130 may be through any wired or wireless communication channel such as wi-fi, BlueTooth, local area network, the Internet, and the like. The access server 110 may be configured to communicate with multiple optical keys and/or optical locks in one or more physical locations and facilities. In some embodiments, the optical lock 120 has a fixed code and the optical key 130 may send a request to the access server 110 to receive the lock code associated with the optical lock 120 to access the locked merchandise. In some embodiments, the optical lock 120 has a rotating code and the optical key 130 may send a request to the access server 110 to receive the lock code for the current time of the day and/or a current day of the week to access the locked merchandise. In some embodiments, when the optical key 130 requests access to the merchandise 125, the access server 110 may transmit a one-time use matching lock code to both the optical key and the optical lock. In some embodiments, optical key 130 may send a request to access merchandise that identifies at least one of the optical lock 120 and the merchandise 125. The unlock request may comprise one or more of an identifier of the user making the request, an authentication code, and an identifier associated with the optical lock device the user wishes to unlock. For example, an unlock request may include one or more of a location of the optical key, an optical lock identifier (lock number, aisle number, section number, etc.), and a merchandise identifier (produce name, product barcode, etc.). In some embodiment, the access server 110 may then retrieve and/or generate a lock code based on the optical lock 120 and/or merchandise 125 identified in the unlock request. In some embodiments, the access server 110 may determine which optical lock to provide the lock code to base on the identifier received from the user of the optical key 130. In some embodiments, the optical lock 120 may be configured to request a lock code from the access server 110 when it detects a light from an optical key.

In some embodiments, the access server 110 further functions to track the use of locks and keys. For example, the access server 110 may maintain a log of access requests and the user and/or optical key associated with each request. The optical key 130 and/or the access server 110 may require a user to enter credentials (username and/or password) prior to submitting an access request and/or activating the optical key 130. In some embodiments, the user credentials used to operate the optical key 130 may be logged by the optical key 130 and/or the access server 110. In some embodiments, the optical key 130 and/or the access server 110 may further prompt the user to enter a number of items to remove or add to the locked space. In some embodiments, the optical lock 120 may communicate with the access server 110 to provide information for each time the optical lock 120 is accessed. The information may contain successful and/or unsuccessful attempts in accessing the merchandise 125. In some embodiments, the optical lock 120 and/or the optical key 130 may further be configured to scan the items in the locked space and provide an item count before and/or after each unlocking event to the access server 110.

While the access server 110 is shown to communicate with both the optical lock 120 and the optical key 130, in some embodiments the access server 110 may be absent from the system or may communicate with only one of the optical lock 120 and the optical key 130. For example, the optical lock 120 may have a rotating lock code based on the time of day and day of the week, month, and/or year etc. The access server 110 may determine which code to provide to the optical key 130 without communicating with the optical lock 120. In some embodiments, each optical key may have a unique fixed lock code. The access server 110 may periodically update the optical lock 120 with a set of currently authorized lock codes and an authorized optical key 130 may access the optical lock 120 without communicating with the access server. In some embodiments, the optical lock 120 may communicate the wavelength peaks and intensities of detected light beam(s) to the access server 110 to determine whether the detected light is emitted by an optical key with a valid lock code.

Figure 2:
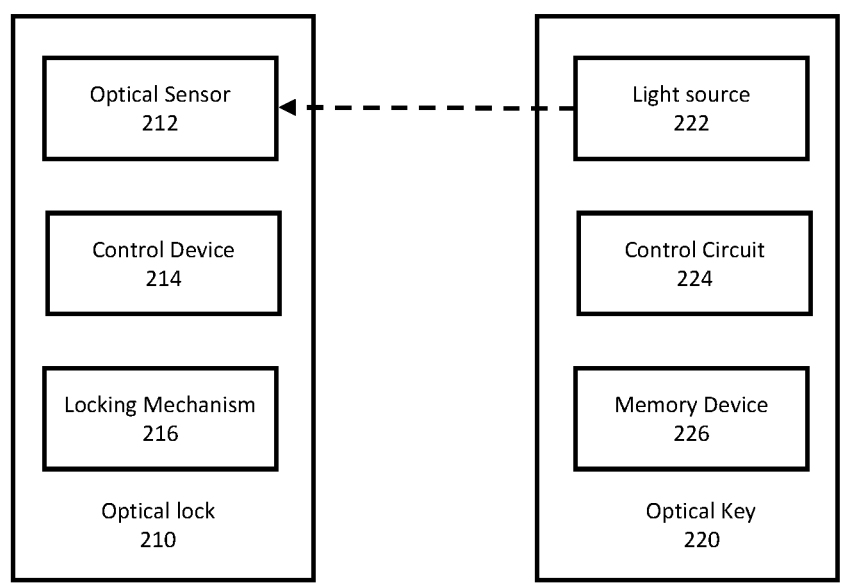
FIG. 2 is a block diagram of an optical lock and an optical key in accordance with several embodiments.

Referring now to FIG. 2, a system for controlling access to merchandise is shown. The system 200 including an optical lock 210 and an optical key 220. The optical lock 210 comprises an optical sensor 212, a control device 214, and a locking mechanism 216.

The optical sensor 212 may comprise one or more optical sensor devices. In some embodiments, the optical sensor 212 may include a spectrometer. In some embodiments, the optical sensor 212 may include a sensor array for sensing the wavelength and/or intensity of multiple light beams. The sensor array may be arranged in a pattern mirroring/matching the pattern of light emitting devices of an optical key such that each sensor is configured to detect and measure light from a corresponding light emitting device. The optical sensor 212 may be configured to simultaneously detect a plurality of wavelengths and an intensity associated with each wavelength from at least one light beam emitted by an optical key. The optical sensor 212 may further be configured to detect modulations of the detected light beam(s) over time.

The control device 214 may include a memory device and a control circuit such as a microprocessor, processor, and hardwired circuit that is configured to receive signals from the optical sensor 212 and control the locking mechanism 216. The control device 214 may be configured to determine whether to release the locking mechanism 216 based on whether intensities of each of the plurality of wavelengths of light beam(s) detected by the one or more optical sensors match a lock code stored in the memory device. The lock code may be stored on a memory device of the control device 214 and/or be retrieved from a server. In some embodiments, the control device 214 may be configured to select a lock code from a plurality of lock codes stored on its memory based on the current time of day and/or the day of the week, month, year, etc. The lock code may specify a plurality of sets of wavelength and intensity combinations. For example, the lock code may specify: 450 nm at 2 W/cm$^2$ 500 nm at 3 W/cm$^2$, and 600 nm at 2 W/cm$^2$. In some embodiments, the intensity specified in the lock code may be relative intensity. For example, the lock code may use a 450 nm light beam or wavelength peak as the reference intensity, and specify that 500 nm should be 30% more intense, and 600 nm should be of equal intensity. In another example, the lock code may specify that 450 nm be the most intense, 500 nm should be second in intensity, and the 600 nm should be the least intense. The control device 214 may allow for a tolerance range when comparing the lock code with the light detected by the optical sensor. For example, if the wavelength peak of the detected light is within 5 nm of the wavelength specified in the lock code, the control device 214 may still determine to release the locking mechanism 216. In another example, if the intensities of each wavelength is below the specified value but the relative intensities approximately matches the lock code, the control device 214 may still determine to release the locking mechanism.

In some embodiments, the optical key 220 may emit a calibration beam and/or a calibration sequence that allows the optical lock 210 to detect the possible degradation of and/or the ambient temperature's effect on the light source. The intensity and/or wavelength deviations detected through the calibration process may be used in the comparison of the detected light beam(s) and the lock code to account for variations in the emitted light due to light source degradation and/or other environmental effects. For example, if the calibration beam is 0.2 W/cm$^2$ less intense than expected, the optical lock may accept a detected beam that has an intensity around 0.2 W/cm$^2$ lower than the intensity specified in the lock code.

In some embodiments, the optical key 220 may adjust a tolerance level based on an environmental temperature either measured locally with a sensor or provided by a server. LED light sources, in particular, may have temperature dependent performance. The control circuit of the optical lock 210 may adjust the sensed wavelength and/or intensity values based on a temperature function prior to comparing the sensor reading to the locked code to account for this issue. For example, the circuit may add 10% to the intensity reading if the temperature is at 50° F. and add 20% to the intensity reading if the temperature is at 30° F. These values are provided as an example only, the actual temperature-based adjustment values and/or equations may be dependent on the light source used and/or factors.

In some embodiments, the optical lock 210 may blank the detected light beam(s) prior to comparing the beam(s) to the light code. The optical lock 210 may detect the constant background spectra shortly before and/or after detecting the light from the optical key 220. The constant background spectra may then be subtracted from the sensor reading to isolate out the wavelengths and intensities transmitted by the optical key 220.

While a lock code is described to contain a wavelength and intensity combination herein, the numerical value stored in the lock may correspond to frequency and/or wavelength represented in any unit measure. In some embodiment, when an array of optical sensors are used, the lock code may further specify a sensor/light source location of each wavelength and intensity combination. While intensity is described using the unit of W/cm2 herein, intensity may be implemented with radiance intensity measurement (W/sr), luminous intensity measurement (lm/sr or cd), photon count, etc. without departing from the spirit of the present disclosure. In some embodiments, the lock code may further include a modulation scheme and the control device 214 may further be configured to compare the modulation scheme specified in the lock code with the modulation of the light detected by the optical sensor. The modulation scheme may comprise one or more of phase, wavelength, and intensity changes over time.

The locking mechanism 216 may comprise any locking means such as a latch, a hook, a magnet, etc. that may be released by the control device 214. In some embodiments, the control device 214 may also be configured to engage the locking mechanism 216. In some embodiments, the locking mechanism 216 may be configured to be engaged manually. The locking mechanism 216 may be implemented on or with one or more of a display shelf, display case, portable case, single item casing, transportation container, storage container, storage shelf, a secured shopping space, and a secured storage space, etc. Generally, the locking mechanism 216 may control access to any merchandise in a supply and distribution chain and/or in a retail facility.

In some embodiments, the optical lock 210 further comprises a communication device for communicating with an access server. The access server may provide the optical lock 210 with one or more lock codes that may be used to release the locking mechanism 216. In some embodiments, the optical lock 210 further communicates each unlock event to the access server such that the access server can keep track of each instant that the optical lock 210 is opened. In some embodiments, the optical lock 210 may also report any unsuccessful access attempts.

The optical key 220 comprises a light source 222, a control circuit 224, and a memory device 226. In some embodiments, the optical key 220 may be implemented with one or more of a portable device (e.g. portable scanner, reader, etc.) used by store associates or transportation workers, as an attachment to the portable device, as part of a point of sales system (e.g. checkout counter, handheld or flatbed barcode scanner, etc.), and/or at a shipping and receiving facility.

The light source 222 may comprise one or more physical light emitting devices such as laser and LED. The light source 222 may emit light in visible and/or invisible wavelengths. In some embodiments, the light source 222 may include a light emitting device array in which each individual light emitting device may be configured to emit a light beam with fixed wavelength and variable intensity, fixed intensity and variable wavelength, or variable wavelength and intensity. In some embodiments, at least one of the light emitting device in the light source array may be a reference light source with fixed wavelength and/or intensity. The light emitting device array may be arranged in a pattern mirroring the pattern of the optical sensor devices of an optical lock such that each light emitting device is configured to direct a light beam towards a corresponding optical sensor device. The light source 222 may be configured to simultaneously emit a plurality of wavelengths each at a specified intensity as controlled by the control circuit 224. The light source 222 may further be configured to emit light according to a modulation scheme with varying phase, intensity, and/or wavelength as controlled by the control circuit 224. In some embodiments, the light source 222 may be implemented with and/or include laser lights for scanning machine readable codes such as barcodes, QR codes, etc.

The control circuit 224 may be any circuitry, such as a microprocessor, processor, and hardwired circuit that is configured to controls the light source 222. The control circuit 224 may be configured to retrieve a lock code from the memory device 226 and drive the light source 222 according to the lock code. The lock code may be downloaded to the memory device 226 via a wired or wireless connection. In some embodiments, the control circuit 224 may be configured to select a lock code from a plurality of lock codes stored in the memory device 226 based on the current time of day and/or the day of the week, month, year, etc. The lock code may specify sets of wavelength and intensity combinations and the control circuit 224 may be configured to drive the light source 222 to provide the specified wavelengths at the corresponding intensities. For example, the lock code may specify wavelength and intensity combinations of: 450 nm at 2 $W/cm^2$ a 500 nm at 3 $W/cm^2$, and a 600 nm at 2 $W/cm^2$. In some embodiments, the light source 222 comprises a single light emitting device and the control circuit 224 may cause the light source 222 to generate a light beam with 450 nm, 500 nm, and 600 nm wavelength peaks each having the specified intensity/amplitude. In some embodiment, an array of light emitting devices may be used and the lock code may further specify a location of each wavelength and intensity combination. The control circuit 224 may determine which light emitting device should generate which wavelength and intensity combination based on the lock code. In some embodiments, the control circuit 224 may select a light emitting device based on the wavelength or intensity of the lock code and only control the other of the wavelength and intensity. For example, the light source may include three light emitting devices with fixed 450 nm, 500 nm, and 600 nm wavelengths and the control circuit may cause each light emitting devices to generate light beams with the intensities of 2 $W/cm^2$, 3 $W/cm^2$, 1 $W/cm^2$ respectively. While a lock code is described to contain a wavelength and intensity combination herein, the numerical value stored in the lock may correspond to frequency and/or wavelength and absolute and/or relative intensity. While intensity is expressed with the unit $W/cm^2$ herein, intensity may be implemented with radiance intensity measurement (W/sr), luminous intensity measurement (lm/sr or cd), photon count, etc. without departing from the spirit of the present disclosure. In some embodiments, the lock code may further include a modulation scheme and the control circuit 224 may further be configured drive the light source 222 according to the modulation scheme specified in the lock code. The modulation scheme may comprise one or more of phase, wavelength, and intensity changes over time.

The memory device 226 may comprise any volatile and/or non-volatile machine readable storage device. The memory device 226 may be configured to store one or more lock codes accessible by the control circuit. In some embodiments, the memory device 226 only temporarily stores the lock code, and is configured to detect the lock code after a set number of uses, after a certain time, and/or after a user logs out of the portable device, etc.

In some embodiments, the optical key 220 further comprises a communication device for communicating with an access server. In some embodiments, a user of the optical key may submit an unlock request to the server. In some embodiments, the optical key 220 further includes a user interface for the user to provide authentication (e.g. password, login, etc.) prior to submitting the access request and/or operating the optical key 220. In some embodiments, the unlock request may be logged by the access server. In some embodiments, the unlock request may be required to include a number of items the user intends to remove or add to the locked space. In some embodiments, the unlock request identifies a specific optical lock the user wishes to access. For example, the user may scan or enter an identifier associated with the optical lock, merchandise, lock location etc. to indicate a specific optical lock to the access server. The access server may provide the optical key 220 with one or more lock codes for use with one or more optical locks 210. In some embodiments, the optical key 220 may also report any unsuccessful authentication attempts to the access server.

In some embodiments, the optical lock 210 may further comprise a light source configured to transmit an optical lock identifier to the optical key 220. In some embodiments, the light source of the optical lock 210 may comprise a device similar to one or more embodiments of the light source 222 described herein. In some embodiments, the optical key 220 may comprise an optical sensor configured to detect the optical lock identifier from the light source of the optical lock 210. In some embodiments, the optical sensor of the optical key 220 may comprise a device similar to one or more embodiments of the optical sensor 212 described herein.

In some embodiments, the optical key 220 may be configured to transmit an activation signal with the light source 222 to activate the light source on the optical lock 210. When the optical key 220 detects the optical lock identifier from the light source of the optical lock with its optical sensor, the optical key 220 may be configured to select a lock code based on the optical lock identifier. The optical key 220 may then control the light source 222 based on the lock code to unlock the optical lock 210.

Figure 3:
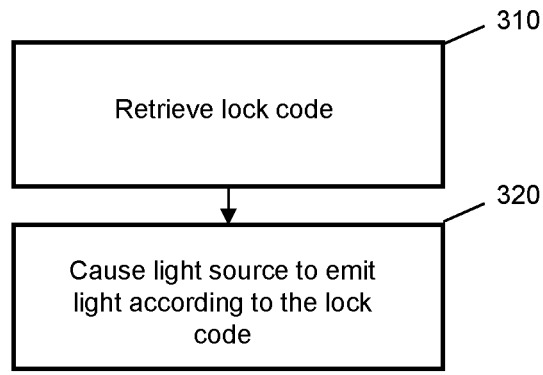
FIG. 3 is a flow diagram of a method for accessing merchandise in accordance with several embodiments.

Referring now to FIG. 3, a method for accessing locked merchandise is shown. Generally, the method shown in FIG. 3 may be implemented with an optical key having a control circuit and one or more light sources. In some embodiments, the method shown in FIG. 3 may be implemented with the optical key 130 shown in FIG. 1 and/or the optical key 220 shown in FIG. 2.

In step 310, a lock code is retrieved. In some embodiments, prior to step 310, a store associate may be required to enter authorization credentials prior to operating the optical key. In some embodiments, the lock code may be retrieved from the memory device of the optical key and/or a server. In some embodiments, a lock code may be selected from a plurality of lock codes based on the lock to be opened, the current time of day, day of week, month and/or year etc. In some embodiments, a user may submit an unlock request to an access server to obtain a lock code. The lock code may be valid for only a specific lock or for multiple optical locks. The access request may specify one or more of a requesting user, a lock to be opened, one or more merchandise to be accessed, and the number of merchandise that will be added and/or removed. The lock code received from the access server may then be stored on a volatile and/or non-volatile memory device of the optical lock.

The lock code may specify two or more wavelengths and an intensity associated with each wavelength. In some embodiments, the wavelengths may also be expressed in term of frequencies in the lock code. The intensity may be expressed in a unit measurement (W/cm$^2$, photon count/nm, W/sr, lm/sr, cd, and the like) and/or as relative values (high, medium, low, etc.) In some embodiments, the lock code may further include a modulation scheme that specifies how one or more of wavelength, intensity, and phase of one or more light beams should vary over time. In some embodiments, when an array of light emitting devices is used, the lock code may further specify a location within the array for each wavelength and intensity combination.

After a lock code is retrieved, the control circuit may determine how to drive the light source based on the lock code. In some embodiments, when a single light emitting device is used, the control circuit may determine which wavelengths to emit and determine an appropriate intensity for each wavelength peak. In some embodiments, when multiple light emitting devices are used, the system may determine which light source should emit which wavelength and intensity combination specified in the lock code.

In step 320, the control circuit causes the light source to emit one or more light beams according to the lock code. In some embodiments, step 320 may be initiated by a user pushing a button on the optical key. In some embodiments, the light source of the optical key may be activated in a similar manner as a hand held scanner. In some embodiments, step 320 may end when the button is released. In some embodiments, if the lock code specifies a modulation scheme, the control circuit may cause the light source to modulate according to the modulation scheme.

In some embodiments, after step 320, the optical key and/or the device including the optical key may be used to scan optical codes (barcodes, QR codes etc.) from the merchandise being removed or added to the lock space. The scanned information may be reported to the access server for logging. The laser for scanning the optical code may be part of or include the light source used to emit light beam(s) according to the lock code in step 320. In some embodiments, the lock code may be erased from the memory device of the optical code once it is used and/or after a preset period of time.

Figure 4:
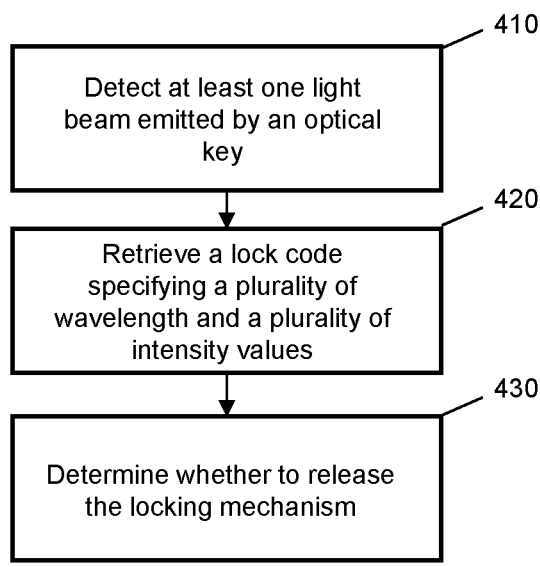
FIG. 4 is a flow diagram of a method for controlling access to merchandise in accordance with several embodiments.

Referring now to FIG. 4, a method for securing merchandise is shown. Generally, the method shown in FIG. 4 may be implemented with an optical lock having a control circuit, one or more light sources, and a locking mechanism. In some embodiments, the method shown in FIG. 4 may be implemented with the optical lock 120 shown in FIG. 1 and/or the optical lock 210 shown in FIG. 2.

In step 410, at least one light emitted by an optical key is detected. Light beam(s) from an optical key may be detected by a single sensor device such as a spectrometer or a plurality of separate sensor devices. In step 420, a lock code specifying a plurality of wavelengths and a plurality of intensity values each associated with a wavelength is retrieved. The lock code may be retrieved from a server and/or a memory device of the optical lock. In some embodiments, the lock code stored on the optical lock may be periodically updated by an access server. In some embodiments, lock code may be provided by the access server when a user requests access to the optical lock. In some embodiments, the optical lock may request a lock code when it detects the at least one light beam in step 410. In some embodiments, the optical lock may select from a plurality of lock codes in step 420 based on the time of day, the day of the week, month, year, etc.

In step 420, the control circuit determines whether to release the locking mechanism restricting access to merchandise based on whether the light beam(s) detected in step 410 matches the wavelength and intensity combinations specified in the lock code retrieved in step 420. In some embodiments, if the optical sensor is a spectrometer, the control circuit compares intensities of wavelength peaks of the spectrometer reading with the wavelength and intensity combinations in the lock code. In some embodiments, when multiple optical sensors are used, each optical sensor device may be configured to detect one wavelength and intensity combination from a light beam. In some embodiments, at least one of the optical sensors may be configured to measure the intensity of a narrow range of wavelengths. For example, one sensor may measure the intensity of light in the 600-650 nm range and a second sensor may measure the intensity of light in the 700-750 nm range. In some embodiments, the control circuit may allow for some tolerance in the wavelength and intensity comparison. For example, if the wavelength of the detected light and/or peak is within 5 nm of the wavelength specified in the lock code, the control circuit may still determine to release the locking mechanism. In some embodiments, the lock code specifies a modulation scheme, and control circuit may further determine whether the modulation of the detected light beam(s) matches the modulation scheme of the lock code in step 430.

If the light detected in step 410 matches the lock code retrieved in step 420, the control circuit may then release the locking mechanism to permit access to the locked merchandise. In some embodiments, the optical lock may report any successful and/or unsuccessful attempts to access the locked merchandise to the access server after step 430.

Figure 5:
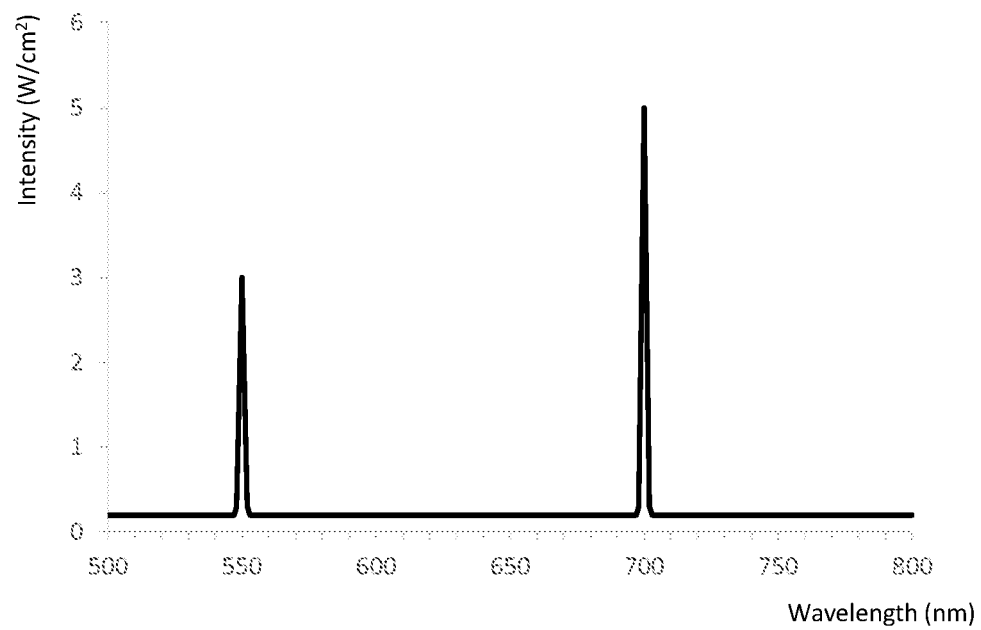
FIG. 5 is an illustration of a detected light beam in accordance with several embodiments.

Referring now to FIG. 5 an illustration of a spectrum of a detected light beam(s) is shown. The graph in FIG. 5 may represent a spectrometer reading from one or more laser light sources having a 500 nm peak at 3 W/cm² intensity and a 700 nm peak at 5 W/cm² intensity. For embodiments using other types of light sources, the wavelength distribution for each peak may be more spread out. In some embodiments, if a lock code specifies the combination of 3 W/cm² at 550 nm and 5 W/cm² at 700 nm and the spectrometer has a read out similar to FIG. 5, an optical lock may determine that the detected light beam matches the lock code and releases the locking mechanism to permit access to locked merchandise. In some embodiments, the detected light beam in FIG. 5 may also match a lock code that specifies peaks at 550 nm and 700 nm, with the 550 nm the peak having a relative intensity of approximately 60% of the intensity of the 700 nm peak. An optical code may specify any number of wavelength and intensity combinations. The intensity values in the optical code may represent an absolute value or a relative value. In some embodiments, one wavelength peak may be a reference peak and the intensities values other wavelength peaks may be defined relative to the intensity of the reference peak. While FIG. 5 includes the visible wavelength spectrum, in some embodiments, wavelengths in the invisible spectrum (e.g. infrared, ultraviolet) may be used.

Figure 6:
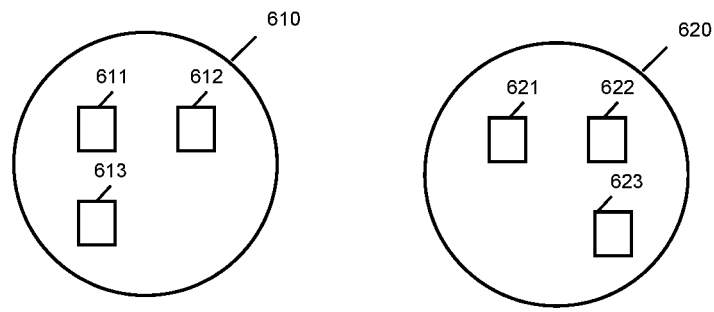
FIG. 6 is an illustration of a light sensor and a light source in accordance with several embodiments.

Referring now to FIG. 6, a pair of optical sensor and light source is shown. Optical sensor 610 includes three optical sensor devices 611, 612, and 613. Each of the sensor devices may be configured to detect one or more wavelength ranges and one or more intensity values. In some embodiments, each of the sensor devices 611, 612, and 613 may be a spectrometer. In some embodiments, each of the sensor devices 611, 612, and 613 may be configured to measure the intensity of one or more bands of wavelengths. The optical sensor devices 611, 612, and 613 are arranged in a pattern that mirrors the pattern of light emitting devices 621, 622, and 623 of the light source 620 such that when the light source 620 is pointed at the optical sensor 610, each of the optical sensor devices 611, 612, and 613 is positioned to measure a light beam from a corresponding one of the light-emitting device 621, 622, and 623.

The light emitting devices 621, 622, and 623 may include any light emitting device such as laser and/or LED. In some embodiments, each of the light emitting devices 621, 622, and 623 may be configured to generate a light beam with variable wavelength and intensity. In some embodiments, at least some of the light emitting devices 621, 622, and 623 may have fixed wavelength and/or intensity. In some embodiments, at least one of the light emitting devices 621, 622, and 623 may be a reference light source with a fixed intensity and/or wavelength. In some embodiments, at least one of the light emitting devices 621, 622, and 623 may be a laser light source of a barcode code scanner.

In FIG. 6, the layout of the optical sensor devices 611, 612, and 613 and the light emitting devices 621, 622, 623 are shown as an example only. An optical sensor 610 and a light source 620 may include any number of sensors and light emitting devices in any arrangement without departing from the spirit of the present disclosure.

In one embodiment, an apparatus for securing merchandise comprises a locking mechanism limiting access to one or more items, one or more optical sensors configured to detect a plurality of wavelengths and an intensity associated with each wavelength from at least one light beam emitted by an optical key, and a control device comprising a control circuit and a memory device. The control device being configured to store a lock code comprising a plurality of wavelength values and a plurality of intensity values each associated with a wavelength value on the memory device and determine whether to release the locking mechanism based on whether intensities of each of the plurality of wavelengths detected by the one or more optical sensors match the lock code.

In one embodiment, an apparatus for accessing locked merchandise comprise one or more light sources configured to emit a plurality of wavelengths each at a specified intensity, a memory device storing a lock code comprising a plurality of wavelength values and a plurality of intensity values each associated with a wavelength value, and a control circuit configured to cause the one or more light sources to emit at least one light beam according to the lock code to unlock an optical lock.

In one embodiment, a system for controlling access to merchandise comprise an optical key comprising one or more light sources configured to emit at least one light beam comprising a plurality of wavelengths each at a specified intensity, and an optical lock comprising one or more optical sensors configured to detect a plurality of wavelengths and an intensity associated with each wavelength from the optical key, wherein the optical lock is configured grant access to one or more locked items in the event that the least one light beam emitted by the optical key matches a lock code comprising a plurality of wavelength values and a plurality of intensity values each associated with a wavelength value.

In one embodiment, a method for securing merchandise comprise detecting, at one or more optical sensors, at least one light beam emitted by an optical key and detect a plurality of wavelengths and an intensity associated with each wavelength from the at least one light beam; retrieving, from a memory device, a lock code comprising a plurality of wavelength values and a plurality of intensity values each associated with a wavelength value; and determine whether to release a locking mechanism limiting access to one or more items based on whether intensities of the plurality of wavelengths detected by the one or more optical sensors match the lock code.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An apparatus for securing merchandise comprising:
   a locking mechanism limiting access to one or more items;
   one or more optical sensors configured to detect a plurality of wavelengths and an intensity associated with each wavelength from at least one light beam emitted by an optical key; and
   a control device comprising a control circuit and a memory device, the control device being configured to:
      store a lock code comprising a plurality of wavelength values and a plurality of intensity values each associated with a wavelength value on the memory device; and
      determine whether to release the locking mechanism based on whether intensities of each of the plurality of wavelengths detected by the one or more optical sensors match the lock code.

2. The apparatus of claim 1, wherein the one or more optical sensors comprise a spectrometer.

3. The apparatus of claim 1, wherein the one or more optical sensors comprise a plurality of sensors arranged in a pattern matching a pattern of light sources in the optical key.

4. The apparatus of claim 1, wherein the at least one light beam comprises light emitted from one or more of a laser and a light emitting diode (LED).

5. The apparatus of claim 1, wherein the lock code further comprises a modulation scheme and the control circuit is further configured to determine whether to release the locking mechanism based on whether a modulation of the at least one light beam from the optical key matches the modulation scheme in the lock code.

6. The apparatus of claim 1, further comprising:
a communication device configured to receive one or more lock codes from a networked server.

7. The apparatus of claim 6, wherein the lock code is received from the server and stored on the memory device, and the control circuit is configured to erase the lock code on the memory device after a preset period of time.

8. The apparatus of claim 6, wherein the lock code is transmitted from the networked server to the memory device in response to receiving a unlock request from a user having the optical key.

9. The apparatus of claim 6, wherein the control circuit is configured to request the lock code in response to the one or more optical sensors detecting the at least one light beam from the optical key.

10. The apparatus of claim 1, wherein the memory device has stored upon it, a plurality of lock codes, and the control circuit selects one lock code from the plurality of lock codes based on one or more of a current time of the day and a current day of the week to determine whether to release the locking mechanism.

11. An apparatus for accessing locked merchandise comprising:
one or more light sources configured to emit a plurality of wavelengths each at a specified intensity;
a memory device storing a lock code comprising a plurality of wavelength values and a plurality of intensity values each associated with a wavelength value; and
a control circuit configured to cause the one or more light sources to emit at least one light beam according to the lock code to unlock an optical lock.

12. The apparatus of claim 11, wherein the one or more light sources are configured to emit a light beam having a plurality of wavelength peaks.

13. The apparatus of claim 11, wherein the one or more light sources comprise a plurality of light sources arranged in a pattern matching a pattern of light sensors on the optical lock.

14. The apparatus of claim 11, wherein the one or more light sources comprise one or more of a laser and a light emitting diode (LED).

15. The apparatus of claim 11, wherein the lock code further comprises a modulation scheme and the control circuit is further configured cause the one or more one light sources to modulate the at least one light beam according to the modulation scheme in the lock code.

16. The apparatus of claim 11, further comprising:
a communication device configured to receive one or more lock codes from a networked server.

17. The apparatus of claim 16, wherein the lock code is transmitted from the networked server to the memory device in response to receiving a unlock request from a user.

18. The apparatus of claim 17, wherein the unlock request comprises one or more of an identifier of the user making the request, an authentication code, and an identifier associated with the optical lock the user wishes to unlock.

19. The apparatus of claim 11 wherein the control circuit is configured to authenticate a passcode entered by a user prior to causing the one or more light sources to emit the at least one light beam.

20. The apparatus of claim 11, wherein the memory device has stored upon it, a plurality of lock codes, and the control circuit is configured to select one lock code based on one or more of a current time of the day and a current day of the week and cause the one or more light sources to emit the at least one light beam according to the selected lock code.

21. A system for controlling access to merchandise comprising:
an optical key comprising one or more light sources configured to emit at least one light beam comprising a plurality of wavelengths each at a specified intensity; and
an optical lock comprising one or more optical sensors configured to detect a plurality of wavelengths and an intensity associated with each wavelength from the optical key;
wherein the optical lock is configured grant access to one or more locked items in the event that the least one light beam emitted by the optical key matches a lock code comprising a plurality of wavelength values and a plurality of intensity values each associated with a wavelength value.

22. The system of claim 21 further comprising:
a network server configured to provide the lock code to at least one of the optical key and the optical lock.

23. A method for securing merchandise comprising:
detecting, at one or more optical sensors, at least one light beam emitted by an optical key and detect a plurality of wavelengths and an intensity associated with each wavelength from the at least one light beam;
retrieving, from a memory device, a lock code comprising a plurality of wavelength values and a plurality of intensity values each associated with a wavelength value; and
determine whether to release a locking mechanism limiting access to one or more items based on whether intensities of the plurality of wavelengths detected by the one or more optical sensors match the lock code.

* * * * *